US012623735B2

(12) United States Patent
Furukawa

(10) Patent No.: US 12,623,735 B2
(45) Date of Patent: May 12, 2026

(54) VEHICLE REAR STRUCTURE

(71) Applicant: TOYOTA JIDOSHA KABUSHIKI KAISHA, Toyota (JP)

(72) Inventor: Tomoaki Furukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 359 days.

(21) Appl. No.: 18/507,492

(22) Filed: Nov. 13, 2023

(65) Prior Publication Data

US 2024/0278849 A1 Aug. 22, 2024

(30) Foreign Application Priority Data

Feb. 21, 2023 (JP) ................................. 2023-025350

(51) Int. Cl.
*B62D 43/00* (2006.01)
*B62D 25/08* (2006.01)
*B62D 43/04* (2006.01)
*B62D 43/10* (2006.01)

(52) U.S. Cl.
CPC ........... B62D 43/045 (2013.01); B62D 25/08 (2013.01); B62D 43/002 (2013.01); *B62D 43/10* (2013.01)

(58) Field of Classification Search
CPC ...... B62D 25/08; B62D 43/10; B62D 43/002; B62D 43/02; B62D 43/04; B62D 43/045
USPC ....................................... 296/37.2
See application file for complete search history.

(56) References Cited

U.S. PATENT DOCUMENTS

| | | | | |
|---|---|---|---|---|
| 5,975,827 | A | * | 11/1999 | Ogata .................. B62D 43/045 |
| | | | | 414/463 |
| 11,498,629 | B2 | * | 11/2022 | Shaner ................... B62D 43/04 |
| 2021/0107574 | A1 | | 4/2021 | Okamura et al. |
| 2022/0185396 | A1 | * | 6/2022 | Shaner ................... B62D 25/20 |
| 2025/0368022 | A1 | * | 12/2025 | Ohe ........................ B60K 1/04 |

FOREIGN PATENT DOCUMENTS

| | | | |
|---|---|---|---|
| JP | 2007-276605 A | | 10/2007 |
| JP | 2018-012445 A | | 1/2018 |
| JP | 2018079889 A | * | 5/2018 |
| JP | 2019064423 A | * | 4/2019 |
| JP | 2021-062784 A | | 4/2021 |

OTHER PUBLICATIONS

JP translation (Year: 2018).*
JP translation (Year: 2019).*

* cited by examiner

*Primary Examiner* — Amy R Weisberg
*Assistant Examiner* — Denise L. Esquivel
(74) *Attorney, Agent, or Firm* — SoraIP, Inc.

(57) ABSTRACT

The frame includes a pair of left and right side frames, a second cross member that is connected to the rear portion of the side frames and supports the rear portion of the motor, and the side frames that extend behind the second cross member along the left-right direction of the vehicle. and a third cross member for detachably suspending and supporting the spare tire so that the spare tire is placed horizontally with the front side lowered, and the spare tire is placed in the middle of the third cross member in the longitudinal direction. A raising and lowering device for supporting and elevating the spare tire is provided, and a raising and lowering guide is provided in the middle of the second cross member in the longitudinal direction to guide the spare tire so that it maintains its posture when the spare tire is lifted or lowered.

2 Claims, 6 Drawing Sheets

F I G. 2
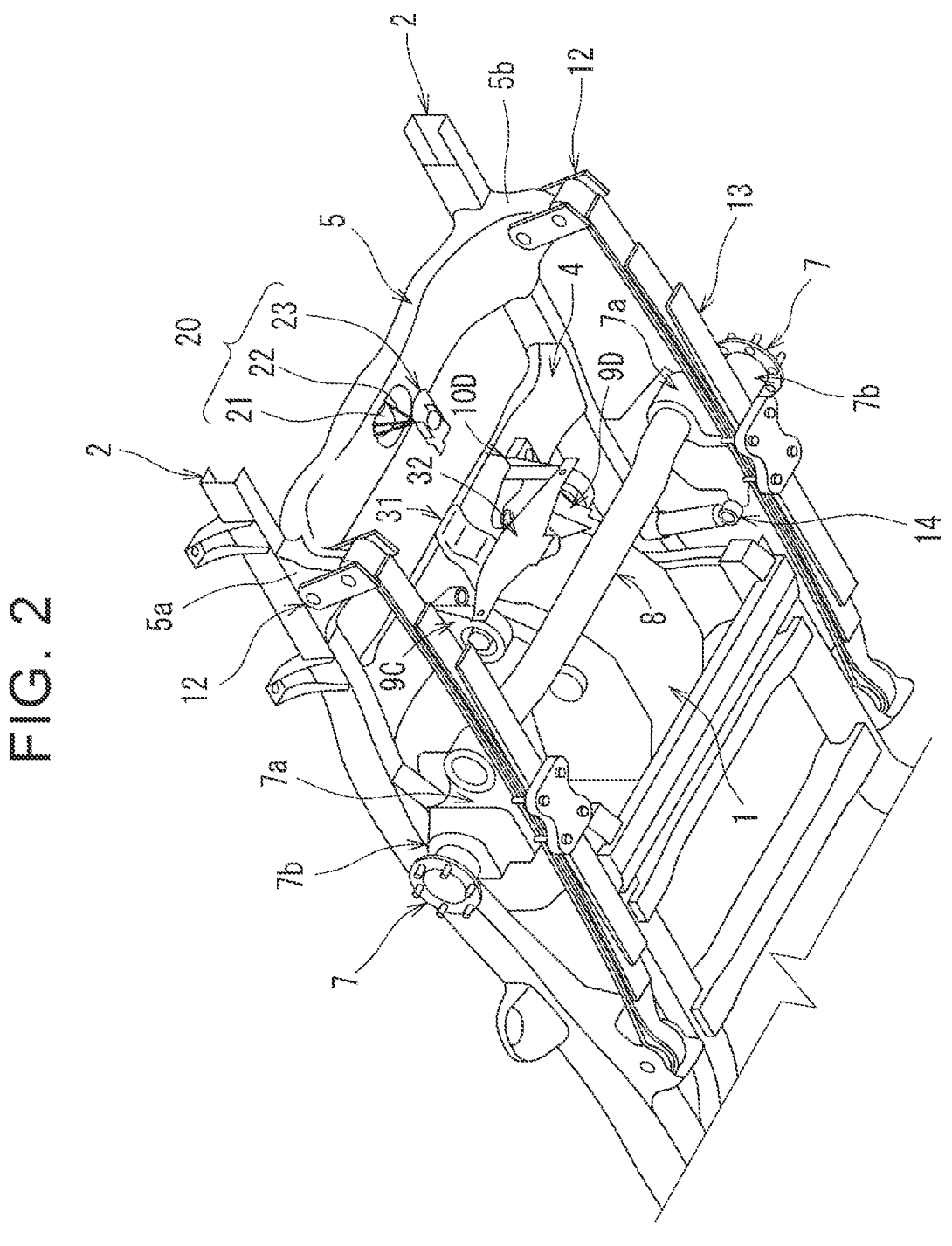

VEHICLE REAR STRUCTURE

CROSS-REFERENCE TO RELATED APPLICATION

This application claims priority to Japanese Patent Application No. 2023-025350 filed on Feb. 21, 2023 incorporated herein by reference in its entirety.

BACKGROUND

1. Technical Field

The present disclosure relates to a vehicle rear structure.

2. Description of Related Art

For example, Japanese Unexamined Patent Application Publication No. 2021-62784 (JP 2021-62784 A) describes "a motor 16 is supported under a rear floor panel 40 of an electrified vehicle 10, a spare tire 24 is supported behind the motor 16 in a vehicle front-rear direction above the rear floor panel 40 of the electrified vehicle 10, and the spare tire 24 is supported by a brace 30 fixed to a body 12."

SUMMARY

JP 2021-62784 A discloses a structure in which a motor and a spare tire are arranged at the rear portion of a vehicle, and the spare tire is placed on a rear floor panel, and a technical idea in which the spare tire is supported to be suspended under a side frame and a cross member is not known.

In view of such circumstances, an object of the present disclosure is to provide a vehicle rear structure capable of suppressing or avoiding interference with the motor and its surroundings when the spare tire is raised and lowered while allowing the spare tire to be suspended and supported under the rear portion of a frame of the vehicle.

The present disclosure provides a vehicle rear structure in which a motor that generates a driving force is supported under a rear portion of a frame of a vehicle, and a spare tire is supported behind the motor in a vehicle front-rear direction, in which:

the frame includes a pair of right and left side frames extending in the vehicle front-rear direction, a front cross member connected to rear portions of the side frames so as to extend along a vehicle right-left direction and supporting a rear portion of the motor, and a rear cross member connected so as to extend along the vehicle right-left direction behind the front cross member in the vehicle front-rear direction in the side frames and detachably suspending and supporting the spare tire such that a front portion of the spare tire is tilted downward and the spare tire is placed horizontally;

a raising and lowering device for supporting, and raising and lowering the spare tire is provided in a middle of the rear cross member in a longitudinal direction; and a raising and lowering guide for guiding the spare tire such that a posture of the spare tire is maintained when the spare tire is raised and lowered is provided in a middle of the front cross member in the longitudinal direction.

As described above, the present disclosure employs a configuration in which the motor and the spare tire are supported under the rear portion of the frame of the vehicle, and the raising and lowering device and the raising and lowering guide are provided.

According to this configuration, in the process of lowering the spare tire to remove the spare tire from the rear cross member by the raising and lowering device, since the front end of the spare tire is in contact with the raising and lowering guide, the spare tire is guided while the front portion of the spare tire is tilted downward and the spare tire is placed horizontally. This makes it possible to suppress or avoid the interference with the motor and its surroundings due to the spare tire swinging during the lowering process.

On the other hand, in the process of raising the spare tire to attach the spare tire to the rear cross member by the raising and lowering device, the spare tire is raised in a horizontal posture. When the spare tire is raised to a predetermined height, the front end of the spare time comes into contact with the raising and lowering guide, and the raising and lowering guide guides the spare tire such that the spare tire is raised while the front portion of the spare time is tilted downward. This makes it possible to suppress or avoid the interference with the motor and its surroundings due to the spare tire swinging during the raising process.

As described above, it is possible to stably and smoothly remove the spare tire (lowering operation) and attach the spare tire (raising operation), thereby ensuring safety.

By the way, in the vehicle rear structure, the raising and lowering device is a chain hoisting mechanism, and is configured such that a holder provided at a tip of a chain is hooked to a center hole of a wheel of the spare tire.

According to this configuration, there is an advantage that the raising and lowering device can be constructed with a relatively simple structure and attaching and detaching the spare tire is simplified, but there is a concern that the spare tire is likely to swing when the spare tire is raised and lowered due to the spare tire being raised and lowered while being suspended with the chain. However, since the posture of the spare tire is stabilized by the raising and lowering guide, the concerns can be eliminated.

In addition, in the above vehicle rear structure, the raising and lowering guide includes a first guide bracket fixed to a lower surface of the front cross member in the middle of the front cross member in the longitudinal direction, and a second guide bracket fixed to a front end of the first guide bracket; a lower rear portion of the first guide bracket is shaped in a curved surface that follows a rounded shape of a front upper shoulder of the spare tire horizontally placed; and a rear portion of the second guide bracket is shaped in a flat surface that follows a shape of an outer circumferential surface of the spare tire horizontally placed.

According to this configuration, the raising and lowering guide can be constructed with a relatively simple structure, and the second guide bracket is fixed to the front cross member, so that the rigidity of the front cross member is improved.

According to the present disclosure, it is possible to provide the vehicle rear structure capable of suppressing or avoiding the interference with the motor and its surroundings when the spare tire is raised and lowered while allowing the spare tire to be suspended and supported under the rear portion of the frame of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a bottom perspective view of the vehicle rear structure before the spare tire is installed;

DETAILED DESCRIPTION OF EMBODIMENTS

Hereinafter, an ideal embodiment for carrying out the disclosure is described in detail with reference to the drawings.

FIGS. 1 to 6 show an embodiment of the disclosure. In the figure, the vehicle rearward direction is "Rr", the vehicle upward direction is "Up", the vehicle leftward direction is "Lh", and the vehicle rightward direction is "Rh".

A motor 1 that generates driving force for the vehicle is supported on the lower side of the rear portion of the vehicle frame. A driving force generated by the motor 1 is transmitted to the left and right rear hubs 7 via the left and right axles 6. The left and right rear hubs 7 are connected by a dodion tube (axle) 8.

Figure 4A:
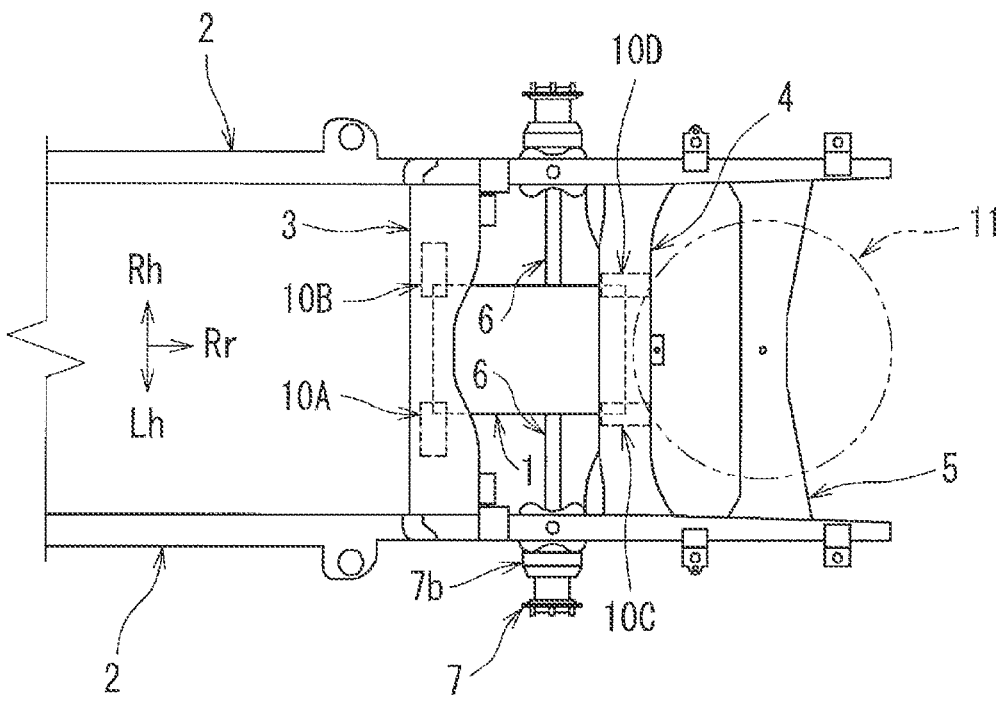
FIG. 4A is a plan view of the vehicle rear structure.
Figure 4B:
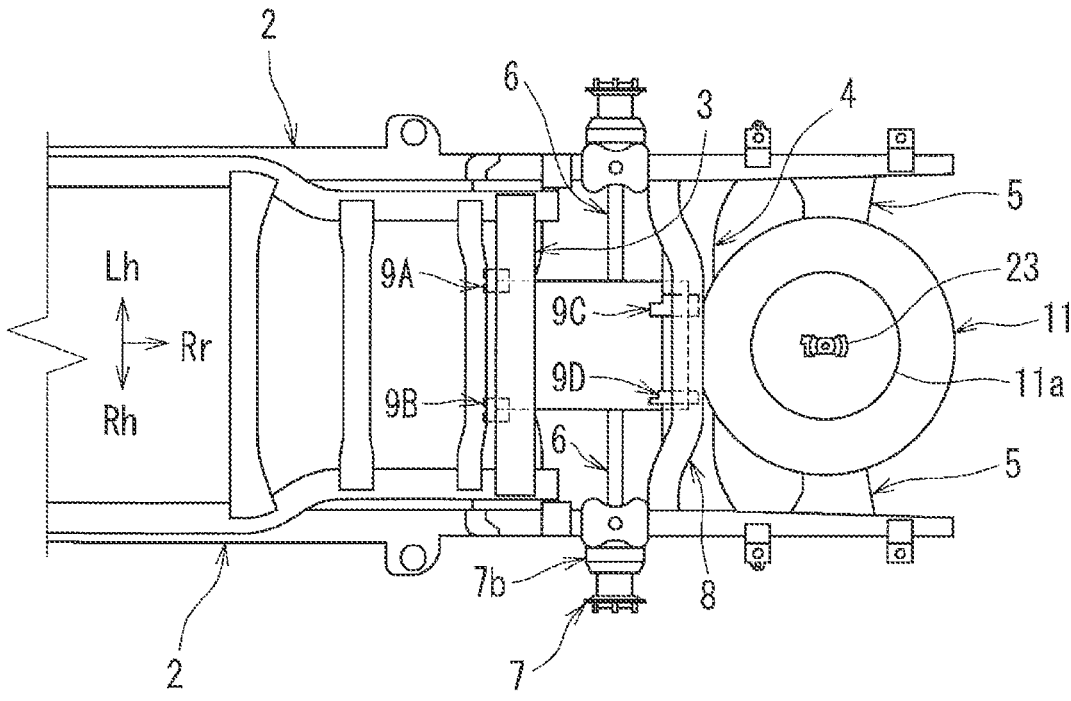
FIG. 4B is a bottom view of the vehicle rear structure.

The frame of the vehicle includes at least a pair of left and right side frames 2, a first cross member 3, a second cross member 4, a third cross member 5, and the like, as shown in FIGS. 4A and 4B, for example.

The side frames 2 are arranged along the longitudinal direction of the vehicle. The first cross member 3, the second cross member 4, and the third cross member 5 are connected to each other so as to span over the side frame 2 along the vehicle left-right direction and to be separated from each other in the vehicle front-rear direction.

The side frame 2, the first cross member 3, the second cross member 4, and the third cross member 5 are hollow and made of, for example, a metal material.

The first cross member 3 is arranged at a predetermined position forward of the motor 1 on the side frame 2. The second cross member 4 and the third cross member 5 are arranged behind the motor 1 in the side frame 2.

The first cross member 3 has a band-like shape in a plan view, and supports the front portion of the motor 1 in the middle in the longitudinal direction. One end and the other end in the longitudinal direction are connected to the inner surface of the side frame 2 by, for example, welding.

Specifically, as shown in FIGS. 1 to 6, front motor mounts 9A and 9B are attached to the front portion of the motor 1 at two locations in the left-right direction of the vehicle, and front brackets 10A and 10B are attached to two locations in the middle of the first cross member 3 in the longitudinal direction. Front motor mounts 9A, 9B are connected to front brackets 10A, 10B.

The second cross member 4 has a belt-like shape in a plan view, and supports the rear portion of the motor 1 in the middle in the longitudinal direction. One end and the other end in the longitudinal direction are connected to the inner surface of the side frame 2, for example, by welding.

Specifically, as shown in FIGS. 1 to 6, rear motor mounts 9C and 9D are attached to the rear portion of the motor 1 at two locations in the left-right direction of the vehicle, and rear brackets 10C and 10D are attached to two locations in the middle of the second cross member 4 in the longitudinal direction. Rear motor mounts 9C, 9D are connected to rear brackets 10C, 10D.

The third cross member 5 is formed in an inverted U shape when viewed from the rear, and a bent portion on one longitudinal end side and a bent portion on the other longitudinal end side are connected to the inner surface of the side frame 2 by, for example, welding. One end side and the other end side in the longitudinal direction protrude below the side frame 2.

A rear end of a leaf spring 13 is attached via a shackle 12 to a protruding portion 5a on one end side and a protruding portion 5b on the other end side of the third cross member 5 in the longitudinal direction. A front end of the leaf spring 13 is supported by the side frame 2.

A rear hub 7 is attached to the middle upper portion of the leaf spring 13 in the longitudinal direction via first and second hub carriers 7a and 7b. A shock absorber 14 is attached between the longitudinal middle of the leaf spring 13 and the first cross member 3.

As is well known, the shackle 12 is a metal fitting used to attach the leaf spring 13 to the frame of the vehicle body.

A spare tire 11 is detachably suspended from the middle of the third cross member 5 in the longitudinal direction via a raising and lowering device 20.

Figure 5A:
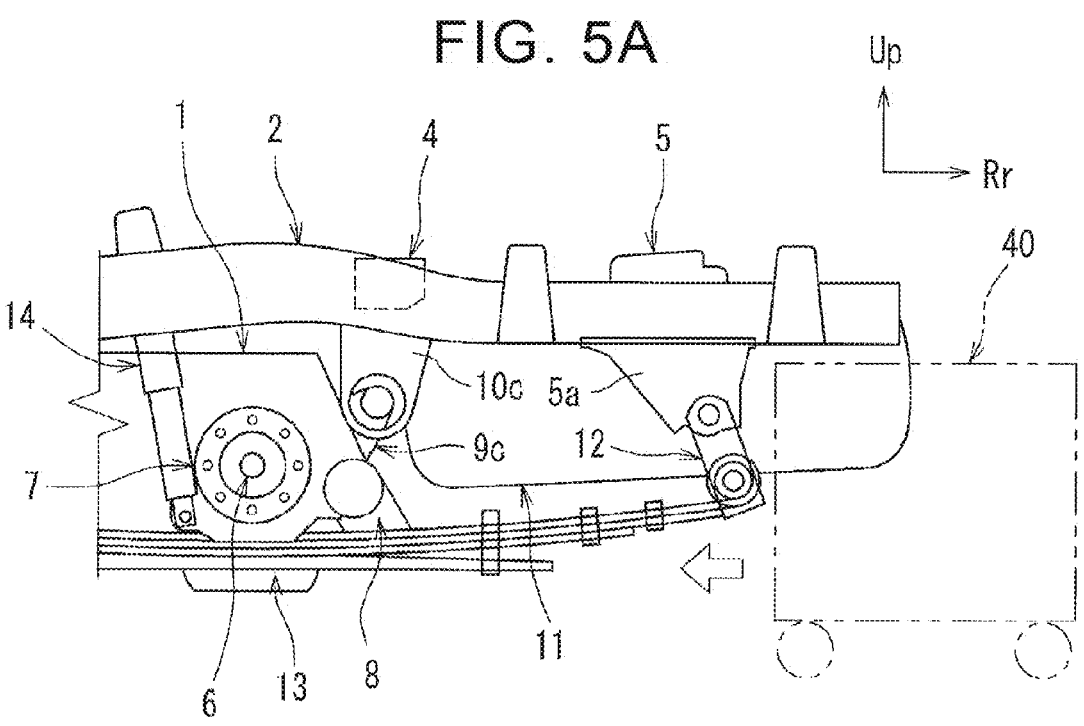
FIG. 5A is a left side view of the vehicle rear structure.
Figure 5B:
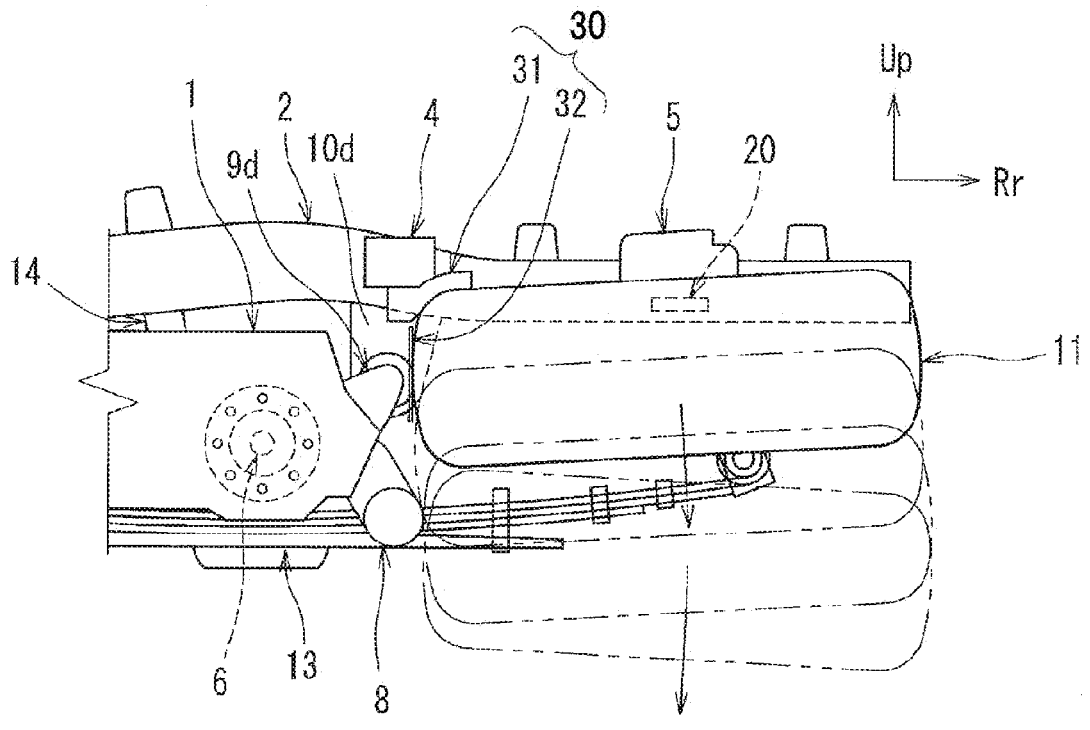
FIG. 5B is a schematic cross-sectional view along the vehicle front-rear direction at the center in the vehicle left-right direction.

As is well known, the spare tire 11 is supported by the third cross member 5 so as to be in a horizontal orientation with its front side lowered, as shown in FIGS. 5A and 5B, corresponding to the departure angle. The forward-downward lateral orientation means that the inclination of the center axis (rotational axis) of the spare tire 11 with respect to the vertical line is less than 45 degrees.

Figure 6:
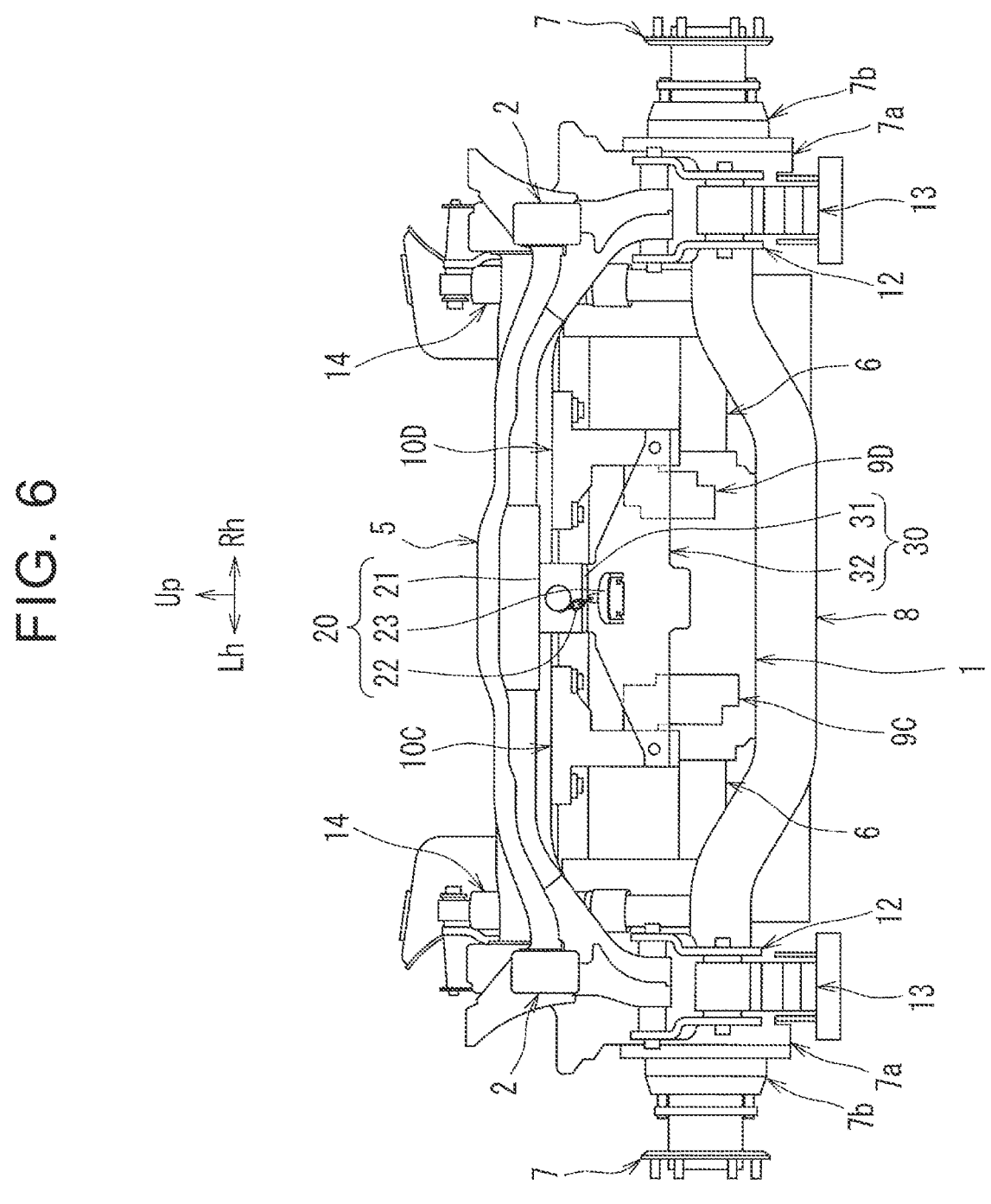
FIG. 6 is a view of the vehicle rear structure as seen from the rear side.

The raising and lowering device 20 supports and lifts or lowers the spare tire 11, and is a known chain winding mechanism as shown in FIGS. 2 and 6, for example.

The raising and lowering device 20 is attached to the middle of the third cross member 5 in the longitudinal direction via a base 21, and the holder 23 provided at the tip of the chain 22 is hooked to the center hole of the wheel 11a of the spare tire 11.

Then, as shown in FIG. 4A, the width of one end side and the other end side in the longitudinal direction of the second cross member 4 and the width of the bent portion on the one end side and the bent portion on the other end side of the third cross member 5 are set larger than the width of other parts. Each of the widths is a dimension along the vehicle front-rear direction.

This improves the rigidity of the connecting portion of the second cross member 4 and the third cross member 5 with respect to the side frame 2.

A raising and lowering guide 30 is provided in the middle of the second cross member 4 in the longitudinal direction.

Figure 1:
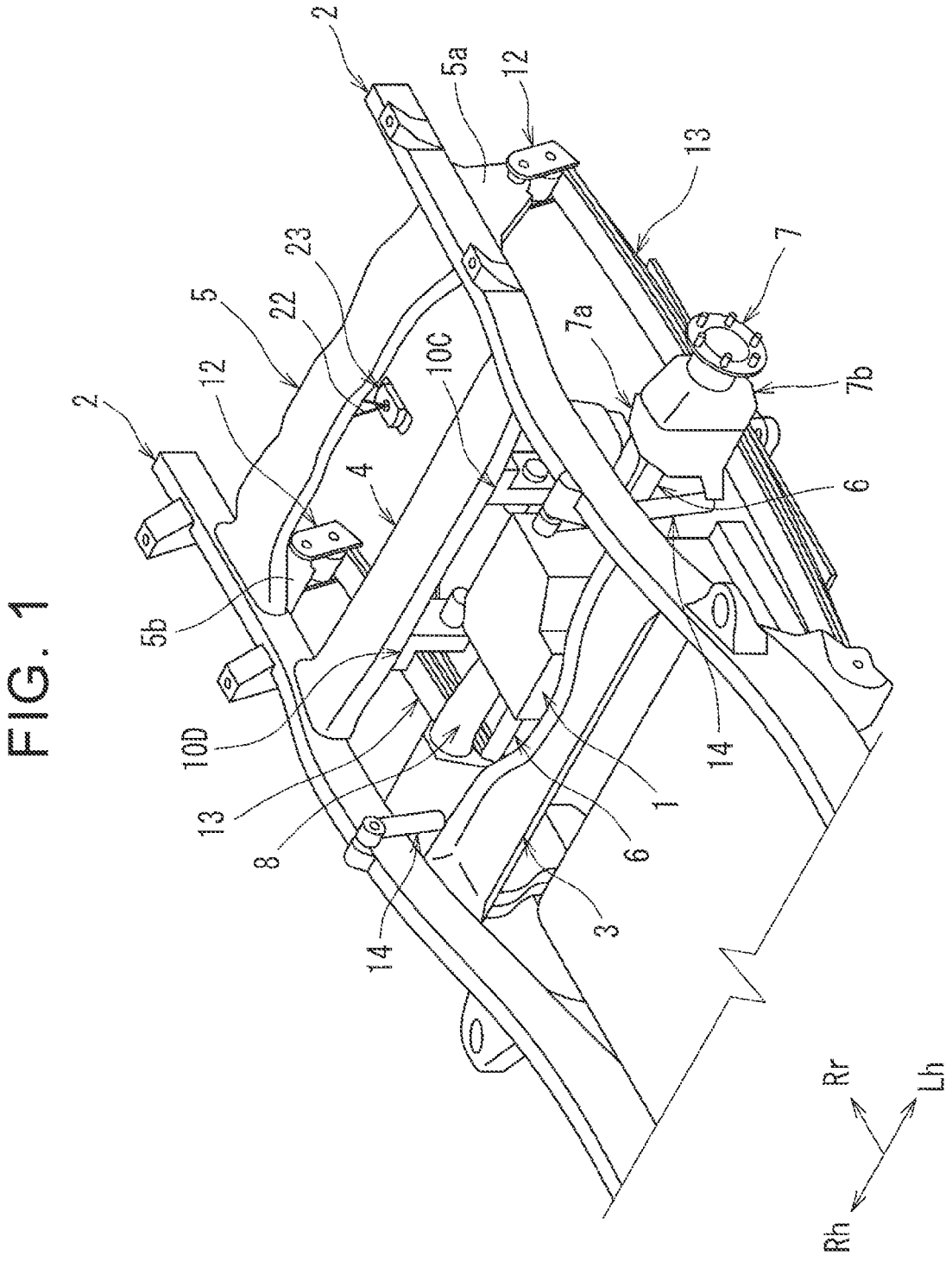
FIG. 1 is a top perspective view of an embodiment of a vehicle rear structure according to the present disclosure.
Figure 3:
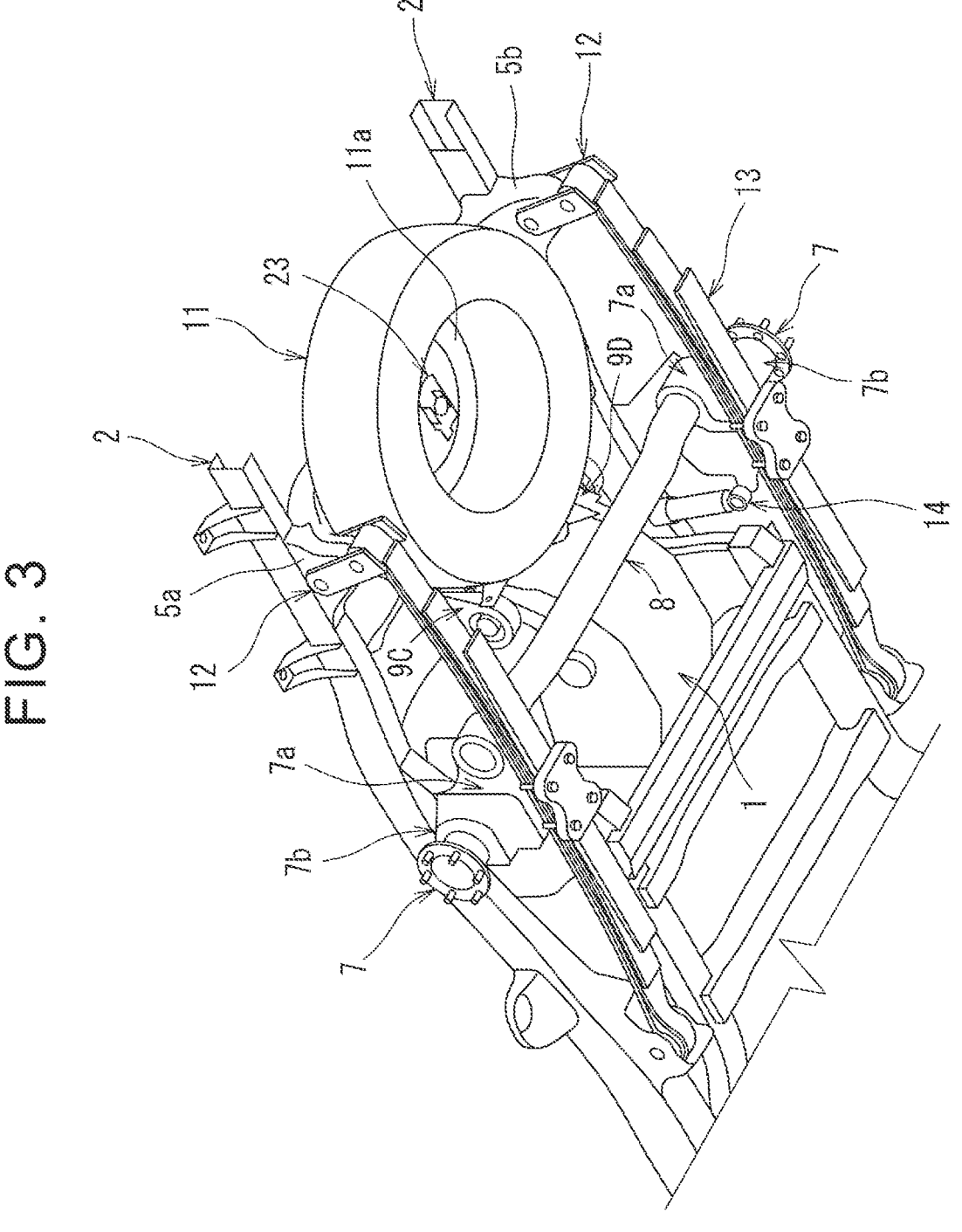
FIG. 3 is a perspective view showing a state in which a spare tire is attached in FIG. 2.

The raising and lowering guide 30 guides the spare tire 11 so as to maintain its posture when the spare tire 11 is raised and lowered. For example, as shown in FIGS. 3 and 6, it is configured by combining the first guide bracket 31 and the second guide bracket 32.

The first guide bracket 31 is a block elongated in the vehicle front-rear direction in a plan view, and is fixed to the lower surface of the second cross member 4 at the center position in the longitudinal direction.

The lower rear portion of the first guide bracket 31 is formed into a curved surface that follows the rounded shape of the upper front shoulder of the spare tire 11 in the laterally placed posture with the front lowered as shown in FIG. 5A. The first guide bracket 31 is arranged at a position such that the upper front shoulder of the spare tire 11 comes into contact with the lower rear curved surface when the spare tire 11 is raised.

The second guide bracket 32 is a plate-like member elongated in the left-right direction of the vehicle when viewed from above, the middle thereof in the longitudinal direction is fixed to the front end of the first guide bracket 31, and one end and the other end in the longitudinal direction is fixed to the left and right rear brackets 10C and 10D of the second cross member 4.

The rear portion of the second guide bracket 32 is formed into a flat surface that follows the shape of the outer peripheral surface of the spare tire 11 in the laterally placed posture with the front side lowered as shown in FIG. 5A. The second guide bracket 32 is arranged at a position such that the front of the outer peripheral surface of the spare tire 11 contacts the rear flat surface when the spare tire 11 is raised.

The flat surface of the rear portion of the second guide bracket 32 is positioned substantially at the same position as the rear edge of the dodion tube 8 in the longitudinal direction of the vehicle.

Since the second guide bracket 32 is fixed to the rear brackets 10C and 10D in this way, the rigidity of the second cross member 4 is improved.

As described above, in the embodiment to which the present disclosure is applied, the second cross member 4 for supporting the motor 1 and the third cross member 5 for supporting the spare tire 11 are installed at the rear portion of the vehicle frame, the motor 1 and the spare tire 11 are arranged in the vehicle longitudinal direction under the rear frame of the vehicle, and the rear part of the leaf spring 13 is attached to the third cross member 5.

According to such a configuration, the rigidity of the rear portion of the vehicle frame is improved compared to the conventional example in which the motor is supported under the rear portion of the vehicle frame and the spare tire is mounted on the floor panel.

As a result, the support rigidity of the load input from the left and right rear wheels (not shown) and the torsional rigidity of the rear part of the vehicle are improved, so that the NV characteristics can be reduced and the function of the leaf spring 13 is improved. It becomes possible to demonstrate stably, and it becomes possible to improve the maneuverability.

Further, in the above embodiment, as shown in FIG. 5A, even if the truck 40 collides with the rear part of the vehicle and the truck 40 enters the rear lower side of the side frame 2, the truck 40 is received by the spare tire 11, each projecting portion 5a, 5b of the third cross member 5, and the shackle 12.

This makes it possible to suppress or prevent the truck 40 from entering the lower side of the side frame 2. Even when another vehicle collides with the rear portion of the vehicle, it is possible to suppress or prevent the other vehicle from entering the lower portion of the rear portion of the side frame 2 in the same manner as described above.

Further, the operation when the spare tire 11 is attached and detached will be described.

First, in the process of lowering the spare tire 11 by the raising and lowering device 20 to remove it from the third cross member 5, due to the front end of the spare tire 11 in contact with the raising and lowering guide 30, as indicated by the chain double-dashed line in FIG. 5B, the spare tire 11 is guided by the raising and lowering guide 30 while maintaining the horizontal position of the spare tire 11 with the front thereof lowered. This makes it possible to suppress or avoid interference with the motor 1 and its surroundings (rear brackets 10C, 10D, etc.) due to the spare tire 11 swinging during the descent process.

On the other hand, in the process of lifting the spare tire 11 to attach it to the third cross member 5 by the raising and lowering device 20, the spare tire 11 is lifted up in a horizontal lateral position. When the spare tire 11 is raised to a predetermined height, the front end of the spare tire 11 comes into contact with the raising and lowering guide 30, and the raising and lowering guide 30 guides the spare tire 11 to be pulled up while tilting forward and downward. This makes it possible to suppress or avoid interference of the spare tire 11 with the motor 1 and its surroundings (rear brackets 10C, 10D, etc.) due to shaking during the ascending process.

Even if the upper and lower front shoulders of the spare tire 11 in the laterally placed posture with the front lowered interferes with the dodion tube 8 when the spare tire 11 is lifted and lowered, the roundness of the shoulders does not interfere with the circular outer peripheral surface of the dodion tube 8. Since the spare tire 11 comes into contact with and is smoothly guided, the attitude of the spare tire 11 is less likely to be greatly disturbed.

In this way, it is possible to stably and smoothly perform the work of removing (lowering) and mounting (lifting) the spare tire 11, thereby ensuring safety.

The disclosure is not limited to the foregoing embodiment. The technical scope of the disclosure is defined by claims, and all changes which come within the meaning and range of equivalency of the claims are therefore intended to be embraced therein.

In the above embodiment, the rear part of the motor 1 is supported by the second cross member 4 via two rear motor mounts 9C, 9D and two rear brackets 10C, 10D. It is not limited.

For example, although not shown, the rear portion of the motor 1 may be supported by the second cross member 4 via one rear motor mount and one rear bracket. In the case of such an embodiment as well, the same actions and effects as those of the above-described embodiment can be obtained.

Further, in the above-described embodiment, an example using the dodion tube 8 is given, but the present disclosure is not limited to this. For example, although it is not shown in the figure, it is possible to adopt a form in which the dodion tube 8 is not used.

The present disclosure can be suitably used for a vehicle rear structure.

What is claimed is:

1. A vehicle rear structure in which a motor that generates a driving force is supported under a rear portion of a frame of a vehicle, and a spare tire is supported behind the motor in a vehicle front-rear direction, wherein:

the frame includes a pair of right and left side frames extending in the vehicle front-rear direction, a front cross member connected to rear portions of the side frames so as to extend along a vehicle right-left direction and supporting a rear portion of the motor, and a rear cross member connected so as to extend along the vehicle right-left direction behind the front cross member in the vehicle front-rear direction in the side frames and detachably suspending and supporting the spare tire such that a front portion of the spare tire is tilted downward and the spare tire is placed horizontally;

a raising and lowering device for supporting, and raising and lowering the spare tire is provided in a middle of the rear cross member in a longitudinal direction;

a raising and lowering guide for guiding the spare tire such that a posture of the spare tire is maintained when the spare tire is raised and lowered is provided in a middle of the front cross member in the longitudinal direction;

the raising and lowering guide includes a first guide bracket fixed to a lower surface of the front cross member in the middle of the front cross member in the longitudinal direction, and a second guide bracket fixed to a front end of the first guide bracket;

a lower rear portion of the first guide bracket is shaped in a curved surface that follows a rounded shape of a front upper shoulder of the spare tire horizontally placed; and a rear portion of the second guide bracket is shaped in a flat surface that follows a shape of an outer circumferential surface of the spare tire horizontally placed.

2. The vehicle rear structure according to claim 1, wherein the raising and lowering device is a chain hoisting mechanism, and is configured such that a holder provided at a tip of a chain is hooked to a center hole of a wheel of the spare tire.

* * * * *